United States Patent [19]

Okamoto et al.

[11] Patent Number: 5,569,716
[45] Date of Patent: Oct. 29, 1996

[54] RUBBER COMPOSITION

[75] Inventors: Kohei Okamoto, Tokuyama; Kyoichi Inoue, Osaka; Takayoshi Kutuno, Tokuyama, all of Japan

[73] Assignee: Idemitsu Petrochemical Co., Ltd., Tokyo, Japan

[21] Appl. No.: 407,109

[22] Filed: Mar. 17, 1995

[30] Foreign Application Priority Data

Jun. 2, 1994 [JP] Japan ................................ 6-142221

[51] Int. Cl.$^6$ ............................ C08L 23/26; C08L 45/00; C08L 7/00; C08L 9/00
[52] U.S. Cl. ......................... 525/192; 525/193; 525/194; 525/216; 525/211; 525/232; 525/240
[58] Field of Search ....................... 525/240, 232, 525/211, 194, 193, 216, 192

[56] References Cited

U.S. PATENT DOCUMENTS

| | | |
|---|---|---|
| 3,607,829 | 9/1971 | Harris . |
| 3,784,530 | 1/1974 | Osborn et al. . |
| 4,048,124 | 9/1977 | Ishikawa et al. . |
| 4,413,067 | 11/1983 | Tsuchiya et al. . |
| 4,419,497 | 12/1983 | Tsuchiya et al. . |
| 5,110,872 | 5/1992 | Sasaki et al. . |
| 5,179,156 | 1/1993 | Takao et al. . |

FOREIGN PATENT DOCUMENTS

| | | |
|---|---|---|
| 63092 | 10/1982 | European Pat. Off. . |
| 0564267 | 10/1993 | European Pat. Off. . |
| 50-051144 | 5/1975 | Japan . |
| 51-0123751 | 9/1975 | Japan . |
| 55-082141 | 6/1980 | Japan . |

OTHER PUBLICATIONS

Database WPIL, No. 84–291 987 (47), Derwent Publications Ltd., London of JP-A-59 181 177 (Oct. 1984).
Database WPIL, No. 88–222 350 (32), Derwent Publications Ltd., London of JP-A-63 128 046 (May 1988).
Database WPIL No. 93–261 868 (33), Derwent Publications Ltd., London of JP-A-05 179 195 (Jul. 1995).

Primary Examiner—Carman J. Seccuro, Jr.
Attorney, Agent, or Firm—Frishauf, Holtz, Goodman, Langer & Chick, P.C.

[57] ABSTRACT

A rubber composition composed of (A) a hydrocarbon rubber, (B) a vulcanizing agent and/or crosslinking agent, and (C) a hydrogenated petroleum resin having a bromine number not greater than 10 (g/100 g). The rubber composition exhibits improved processability over hydrocarbon rubber used alone but has no bad influence on the physical properties and heat resistance of its vulcanizate. It is free from any trouble involved in crosslinking with a peroxide which is often used for EPR and EPDM. Therefore, it will find general use in the rubber industry.

14 Claims, No Drawings

RUBBER COMPOSITION

BACKGROUND OF THE INVENTION

1. Field of the Invention

The present invention relates to a rubber composition based on hydrocarbon rubber which exhibits improved processability over hydrocarbon rubber used alone but has no bad influence on the physical properties and heat resistance of its vulcanizate.

2. Description of the Prior Art

Hydrocarbon rubber has some disadvantages. That is, it is insufficient in adhesion, it has an excessively high viscosity, it winds around the roll during processing, and it gives a vulcanizate poor in adhesion.

A common practice to cope with this situation has been to incorporate the hydrocarbon rubber with a tackifier, which includes coumarone resin, phenolic resin, petroleum resin, terpene resin, and rosin derivative.

Although a tackifier improves hydrocarbon rubber in processability, it adversely affects the vulcanizate in physical properties and heat resistance. Moreover, there is a knotty problem that a tackifier hinders crosslinking with a peroxide (which is often used for EPDM).

The present invention was completed to solve the above-mentioned problem. It is an object of the present invention to provide a rubber composition based on hydrocarbon rubber which exhibits improved processability over hydrocarbon rubber used alone but has no bad influence on the physical properties and heat resistance of its vulcanizate.

In order to solve the above-mentioned problem, the present inventors carried out a series of researches which led to the finding that a rubber composition based on hydrocarbon rubber exhibits improved processability over hydrocarbon rubber used alone but has no bad influence on the physical properties and heat resistance of its vulcanizate, if it is incorporated with a specific resin as a tackifier. The present invention is based on this finding.

SUMMARY OF THE INVENTION

The present invention is embodied in a rubber composition which comprises (A) a hydrocarbon rubber, (B) a vulcanizing agent and/or crosslinking agent, and (C) a hydrogenated petroleum resin having a bromine number not greater than 10 (g/10 g).

DESCRIPTION OF THE PREFERRED EMBODIMENTS

In the present invention, a hydrocarbon rubber is used as component (A). By hydrocarbon rubber is meant any rubber composed of hydrocarbons. It includes, for example, ethylene-propylene copolymer rubber (EPR), ethylene-propylene-diene copolymer rubber (EPDM), natural rubber (NR), isoprene rubber (IR), styrene-butadiene copolymer rubber (SBR), and butadiene rubber (BR). They may be used alone or in combination with one another.

Though these hydrocarbon rubbers are usually insufficient in processability and adhesion of vulcanizate as compared with chlorine- or sulfur-containing non-hydrocarbon rubbers such as chloroprene rubber (CR) and chlorosulfonated polyethylene rubber (CSM), these problems can be solved by the rubber composition of the present invention.

Further, decrease in heat resistance after processing and occurance of hindrance in crosslinking by a peroxide can be suppressed by the rubber composition of the present invention.

Therefore, the present invention manifests it best effect when applied to ethylene-propylene copolymer rubber (EPR), which undergoes peroxide crosslinking instead of vulcanization, and ethylene-propylene-diene copolymer rubber (EPDM), which often undergoes crosslinking with a peroxide in practical use.

Ethylene-propylene copolymer rubber (EPR) and ethylene-propylene-diene copolymer rubber (EPDM) are a rubbery polymer containing propylene in an amount of 15–50 mol %. The diene component is dicyclopentadiene, ethylidenenorbornene, or 1,4-hexadiene.

The hydrocarbon rubber that can be used in the present invention includes any known ethylene-propylene copolymer rubber (EPR) and ethylene-propylene-diene copolymer rubber (EPDM).

In the present invention, a vulcanizing agent and/or crosslinking agent is used as component (B).

The reason why the term "a vulcanizing agent and/or crosslinking agent" is used as component (B) is that ordinary skilled person in the rubber technology do not perfectly distinguish the vulcanizing agent from the crosslinking agent as vulcanization is equal to a crosslinking reaction, and therefore the vulcanizing agent and the crosslinking agent can be regard as synonyms in the rubber technology. Accordingly, they are used synonymously in the present invention.

The vulcanizing agent and/or crosslinking agent used as component (B) in the present invention means the following chemicals which are used to crosslink hydrocarbon rubbers.

That is to say, component (B) includes sulfur in varied forms, such as powder sulfur, precipitated sulfur, colloidal sulfur, surface-treated sulfur, and insoluble sulfur; sulfur compounds, such as sulfur chloride, sulfur dichloride, morpholine disulfide, and alkylphenol disulfide; inorganic vulcanizing agent other than sulfur, such as selenium and tellurium; and p-quinonedioxime, p,p'-dibenzoylquinonedioxime, tetrachloro-p-benzoquinone, and poly-p-dinitrobenzene.

Further, component (B) includes organic peroxides, such as tert-butylhydroperoxide, 1,1,3,3-tetramethylbutylhydrope roxide, p-methanehydroperoxide, cumenehydroperoxide, diisopropylbenzenehydroperoxide, 2,5-dimethylhexane-2,5-dihydroperoxide, di-tert-butylperoxide, dicumylperoxide, tert-butylcumylperoxide, 1,1-bis(tert-butylperoxy) cyclododecane, 2,2-bis(tert-butylperoxy)octane, 1,1-di-tert-butylperoxycyclohexane, 2,5-dimethyl-2,5-di-(tert-butylperoxy)hexane, 2,5-dimethyl-2,5-(tert-butylperoxy) hexyne-3, 1,3-bis(tert-butylperoxy-isopropyl)benzene, 2,5-dimethyl-2,5-di(benzoylperoxy)hexane, 1,1-bis(tert-butylperoxy)-3,5-trimethylcyclohexane, n-butyl-4,4-bis(tert-butylperoxy)valerate, benzoylperoxide, m-tolylperoxide, p-chlorobenzoylperoxide, 2,4-dichlorobenzoylperoxide, tert-butylperoxyisobutyrate, tert-butylperoxy-2-ethylhexanoate, tert-butylperoxybenzoate, tert-butylperoxyisopropylcarbonate, and tert-butylperoxyallylcarbonate.

Still further, component (B) includes (meth)acrylate of polyhydric alcohols, such as ethylene glycol dimethacrylate and trimethylolpropane trimethacrylate; and triallyl isocyanurate.

In the present invention, the above-mentioned vulcanizing agents and/or crosslinking agents as component (B) may be used alone or in combination with one another.

Of the examples listed above, sulfur compounds and organic peroxides (such as dicumyl peroxide) are preferable.

In the present invention, a hydrogenated petroleum resin having a bromine number not greater than 10 (g/100 g) is used as component (C). Without component (C), it is impossible to achieve the object of the present invention. Component (C) cannot be replaced with coumarone resin or phenolic resin to achieve the object of the present invention.

The hydrogenated petroleum resin is a compound which is obtained by hydrogenation of a petroleum resin by the aid of a noble metal catalyst. The petroleum resin is one which is obtained by cationic polymerization or radical polymerization (thermal polymerization) of a mixture of crude or purified hydrocarbons having various carbon-carbon unsaturated bonds resulting from thermalcracking of petroleum naphtha and so on. It contains various carbon-carbon unsaturated bonds for hydrogenation.

The petroleum resin has an average molecular weight of about 200–2000 and a softening point of about 40°–180° C.

It includes aliphatic type petroleum resin, dicyclopentadiene (DCPD) type petroleum resin, aromatic type petroleum resin, or copolymer type petroleum resin.

The aliphatic type petroleum resin is one which is obtained by cation polymerizing using aluminum chloride as a catalyst the fraction from naphtha cracking oil, which fraction has a boiling point of about 20°–80° C., and is mainly a compound of $C_5$ fraction.

It is assumed to have both cyclic and chain structures. The $C_5$ fraction is composed mainly of chain diolefins and chain monoolefins which are capable of polymerization. Therefore, it is comparatively difficult to yield a resin having a higher softening point.

In the case of polymerization by the aid of an aluminum halide catalyst, the chain diolefins are cyclized and hence the resulting resin has a high softening point.

However, the cyclization is partly prohibited by presence of chain monoolefins, and hence the resulting resin inevitably has a high molecular weight if it is to have a softening point of about 100° C. Therefore, the aliphatic type petroleum resin usually has a high molecular weight and a broad molecular weight distribution.

The dicyclopentadiene type petroleum resin is one which is obtained by concentration, followed by thermal polymerization, of cyclopentadiene (CPD) and its dimer or dicyclopentadiene (DCPD) in the C5 fraction. It has a special feature that the cyclic structure is included in the main chain. Therefore, it usually has a lower molecular weight and a higher softening point.

The aromatic type petroleum resin is one which is obtained by cation polymerization or thermal polymerization of aromatic compounds which is composed of mainly a $C_9$ fraction including styrenes and indenes of naphtha cracking oil.

These aromatic compounds have aromatic rings, and in the case that these aromatic compounds are polymerized, these aromatic compounds yield a resin having the cyclic structure in the side chain. This resin has a lower molecular weight and a higher softening point than the aliphatic type petroleum resin.

However, it has an bad color and gives off a strong odor when melted. In order to eliminate these disadvantages, there has been proposed a pure monomer type petroleum resin produced from a pure monomer containing a maximum amount of styrene and substituted styrene (such as α-methylstyrene and vinyltoluene).

The copolymer type petroleum resin is obtained by copolymerization of the above-mentioned aliphatic type monomer, DCPD type monomer, and aromatic type monomer. It broadly varies depending on the monomers selected.

The hydrogenated petroleum resin used as component (C) in the present invention is a compound which is obtained by hydrogenation of remaining carbon-carbon unsaturated bonds in the petroleum resin by the aid of a noble metal catalyst.

The hydrogenation may be accomplished in the usual way. Without hydrogenation, the resulting petroleum resin has an excessively high bromine number and hence has an bad influence on the physical properties and heat resistance of the resulting rubber product.

The hydrogenated petroleum resin used in the present invention should preferably be one which is obtained by hydrogenation from DCPD type petroleum resin, aromatic type petroleum resin, or copolymer type petroleum resin. They may be used alone or in combination with one another.

A preferred example of component (C) is obtained by hydrogenation of a copolymer of cyclopentadiene and/or dicyclopentadiene with a vinyl monomer containing aromatic groups. It is a hydrogenated petroleum resin having a bromine number not greater than 10 (g/100 g). To be more specific, it is obtained by hydrogenation of a [cyclopentadiene and/or dicyclopentadiene]-[styrene] copolymer.

According to the present invention, the hydrogenated petroleum resin should have a bromine number not greater than 10 (g/100 g), preferably not greater than 8 (g/100 g).

With a bromine number greater than specified, the hydrogenated petroleum resin has an bad influence on the physical properties and heat resistance of the resulting rubber product. The desired bromine number can be obtained by performing hydrogenation on the petroleum resin after its polymerization in the presence of a noble metal catalyst such as nickel and palladium. The hydrogenation adds hydrogen to the carbon-carbon unsaturated bonds. The bromine number should be measured according to JIB K 2605.

The rubber composition of the present invention is composed mainly of the above-mentioned three components (A), (B), and (C).

The rubber composition should contain component (B) in an amount of 0.2–20 parts by weight, preferably 0.5–10 parts by weight, for 100 parts by weight of component (A). With component (B) in an amount less than specified above, the resulting rubber product is insufficient in vulcanization and crosslinking. With component (B) in an amount more than specified above, the resulting rubber product is poor in rubber elasticity.

Also, the rubber composition should contain component (C) in an amount of 0.5–50 parts by weight, preferably 2–20 parts by weight, for 100 parts by weight of component (A). With component (C) in an amount less than specified above, the resulting rubber product is poor in physical properties and heat resistance. With component (C) in an amount more than specified above, the resulting rubber product is poor in rubber elasticity.

According to the present invention, the rubber composition composed mainly of the above-mentioned basic components ( A ), (B), and ( C ) may be incorporated with the following additives, as required.

That is to say, the additives include a vulcanization accelerator, such as those of the guanidine type, aldehydeamine type, aldehyde-ammonia type, thiazole type, sulfenamide type, thiourea type, thiuram type, dithiocarbamate type, xanthate type, dithiophosphate type, and phosphorodithioate type. They may be used alone or in combination with one another.

The additives further include an accelerator activator, such as metal oxides, metal carbonates, fatty acids and derivatives thereof, and amines; and an antiscorching agent, such as organic acids, nitroso compounds, thiophthalimides, and sulfonamide derivatives.

The additives also include an age resistor, an antioxidant, and an antiozonant, such as those of the naphthylamine type, diphenylamine type, p-phenylenediamine type, quinoline type, hydroquinone derivative, monophenol type, bis-, tris-, polyphenol type, thiobis-phenol type, hindered phenol type, phosphite ester type, thiodipropionate type, benzimidazole type, nickel dithio-carbamate type, thiourea type, triazole type, and wax; and an UV absorber and a photostabilizer, such as those of salicylic acid derivatives, benzophenone type, benzotriazole type, oxalanilide derivatives, hydroxybenzoate type, and hindered amine type. They may be used alone or in combination with one another.

Further, the additives include a softener, such as petroleum oil (process oil), ethylene-a -olefin oligomer, paraffin wax, liquid paraffin, white oil, petrolatum, petroleum sulfonate, gilsonite, asphalt, diene oligomer (including hydrogenated one), vegetable oil softener (caster oil, cotton seed oil, rapeseed oil, palm oil, peanut oil, pine oil, tall oil, etc.), rubber substitute (vulcanized oil), fatty acid, fatty acid salt, and fatty acid ester. They may be used alone or in combination with one another.

Still further, the additives include reinforcing material and a filler, such as carbon black (channel black, furnace black, thermal black, acetylene black, etc.), silica (white carbon, etc.), basic magnesium carbonate, calcium carbonate (light calcium carbonate, ground calcium carbonate, and surface-treated calcium carbonate), magnesium silicate (ultrafine magnesium silicate), clay, talc, wollastonite, zeolite, diatomaceous earth, silica sand, alumina sol, aluminum hydroxide, aluminum sulfate, barium sulfate, calcium sulfate, lithopone, molybdenum disulfide, rubber power, shellac, cork powder, and cellulose powder. They may be used alone or in combination with one another.

Lastly, the additives include other additives including a peptizer, a blowing agent, blowing promotors, a slip agent, an internal mold release, an antifogging agent, a flame retardant, a built-in antistatic agent, a coloring agent (pigment and dye), a coupling agent, an antiseptic agent, an anti-mildew agent, and a reodorant.

The rubber composition of the present invention is prepared by mastication of component (A) and subsequent mixing with other components. The resulting unvulcanized rubber is crosslinked in the mold by injection molding or the like.

EXAMPLES

To further illustrate the invention, and not by way of limitation, the following examples are given.

PRODUCTION EXAMPLE 1

(Production of cyclopentadiene-styrene copolymer)

A 1-liter pressure vessel made of stainless steel (BUS 304), with the atmosphere therein replaced with nitrogen, was charged with 200 g of xylene as a solvent. After heating to 230° C., the pressure vessel was further charged with a mixture of cyclopentadiene and styrene (200 g each) with stirring over 2 hours. The reactants underwent copolymerization at 250° C. for 2 hours.

After the reaction was complete, the reaction product (liquid) was freed of unreacted monomers and xylene by using a rotary evaporator. The resulting product was a cyclopentadiene-styrene copolymer (375 g), whose properties are shown in Table 1.

PRODUCTION EXAMPLE 2

(Production of hydrogenated cyclopentadiene-styrene copolymer)

The copolymer obtained in Production Example 1 above underwent hydrogenation at 200° C. for 6 hours in the presence of a nickel-kieselgur catalyst (containing 45 wt % of nickel), with the hydrogen pressure being 30 kg/cm$^2$G. The resulting product was a hydrogenated cyclopentadiene-styrene copolymer, whose properties are shown in Table 1.

PRODUCTION EXAMPLE 3

(Production of dicyclopentadienestyrene copolymer)

A 1-liter pressure vessel made of stainless steel (SUS304), with the atmosphere therein replaced with nitrogen, was charged with 220 g of xylene as a solvent. After heating to 230° C., the pressure vessel was further charged with a mixture of dicyclopentadiene and styrene (200 g each) with stirring for over 2 hours. The reactants underwent copolymerization at 250° C. for 1.5 hours.

After the reaction was complete, the reaction product (liquid) was freed of unreacted monomers and xylene by using a rotary evaporator. The resulting product was a dicyclopentadiene-styrene copolymer (370 g), whose properties are shown in Table 1.

PRODUCTION EXAMPLE 4

(Production of hydrogenated dicyclopentadiene-styrene copolymer)

The copolymer obtained in Production Example 3 above underwent hydrogenation in the same manner as in Production Example 2. The resulting product was a hydrogenated dicyclopentadiene-styrene copolymer, whose properties are shown in Table 1.

TABLE 1

| Production Example No. | 1 | 2 | 3 | 4 |
|---|---|---|---|---|
| Softening point (°C.) | 67 | 93 | 85 | 102 |
| Bromine number (g/100 g)* | 62 | 2.5 | 61 | 2.2 |
| Number average molecular weight (VPO) | 590 | 600 | 610 | 630 |
| Color (Gardner) | 5 | $\leqq 1$ | 5 | $\leqq 1$ |
| Acid value (mg KOH/g) | $\leqq 1$ | $\leqq 1$ | $\leqq 1$ | $\leqq 1$ |

*Measured according to JIS K 2605

EXAMPLES 1 AND 2

Comparative Examples 1 and 2, and Referential Example 1

EPDM (1) (as component (A) in the formulation shown in Table 2) underwent mastication at 150° C. for 1 minute in a Banbury mixer (MIXTRON BB, made by Kobe Steel Co. Ltd.). The masticated EPDM was subsequently mixed with other components shown in Table 2 for 4 minutes. The resulting unvulcanized rubber was tested for physical properties, scorching properties, and crosslinking properties. The results are shown in Table 2. The unvulcanized rubber was crosslinked in a mold at 160° C. for 15 minutes. The resulting crosslinked product was tested for physical properties. The results are shown in Table 2.

It is noted from Table 2 that the sample in Referential Example 1 has a high Mooney viscosity ($ML_{1+4}$) and is poor in tackiness and processability, whereas the samples in Examples 1 and 2 and Comparative Examples 1 and 2 have improved processability. The data of Mooney viscosity and the values of Vm for scorching properties indicate that the samples in Examples 1 and 2 are superior in processability to those in Comparative Examples 1 and 2. The fact that the samples in Comparative Examples 1 and 2 have higher values of $t_5$ (for scorching properties) and $t_{10}$ and $t_{90}$ (for crosslinking properties) and lower values of γS than the sample in Referential Example 1 suggests the inhibition of curing. By contrast, the inhibition of curing did not occur in Examples 1 and 2. The samples in Comparative Examples 1 and 2 are inferior in crosslinking properties to those in Referential Example 1. This is indicated by the lower tensile strength, lower 100% modulus, lower hardness, higher elongation at break, and higher compression set. By contrast, the samples in Examples 1 and 2 are comparable to that in Referential Example 1.

TABLE 2

| Run No. | Ref. Ex. 1 | Ex. 1 | Ex. 2 | Com. Ex. 1 | Com. Ex. 2 |
|---|---|---|---|---|---|
| Formulation (parts by weight) | | | | | |
| Component (A), EPDM (1)*1 | 100 | 100 | 100 | 100 | 100 |
| Component (B). dicumyl peroxide*2 | 6.75 | 6.75 | 6.75 | 6.75 | 6.75 |
| ZnO*3 | 5 | 5 | 5 | 5 | 5 |
| Stearic acid | 0.5 | 0.5 | 0.5 | 0.5 | 0.5 |
| Carbon black*4 | 50 | 50 | 50 | 50 | 50 |
| Component (C) from Production Example 2 | — | 5 | 10 | — | — |
| Hydrocarbon resin*5 | — | — | — | 5 | 10 |
| Properties of unvulcanized rubber | | | | | |
| Tackiness*6 | poor | good | good | good | good |
| $ML_{1+4}$ (100° C.)*7 | 103 | 96 | 91 | 100 | 100 |
| Scorching properties (125° C.)*8 | | | | | |
| Vm | 62 | 57 | 53 | 60 | 58 |
| $t_5$ (minutes) | 11.5 | 13.3 | 14.0 | 16.2 | 24.0 |
| Crosslinking properties (ODR, 160° C.)*9 | | | | | |
| $t_{10}$ (minutes) | 1.8 | 1.8 | 1.9 | 2.0 | 2.2 |
| $t_{90}$ (minutes) | 16.7 | 16.8 | 16.7 | 18.6 | 19.4 |
| $\Delta S$ (kgf · cm) | 73.6 | 65.7 | 60.8 | 43.7 | 31.5 |
| Properties of vulcanized rubber (160° C. × 15 min)*10 | | | | | |
| Tensile strength (kgfcm$^2$) | 237 | 234 | 242 | 230 | 195 |
| 100% modulus | 46 | 41 | 39 | 28 | 25 |
| Elongation at break (%) | 240 | 260 | 280 | 560 | 720 |
| Hardness (JIS-A) | 76 | 76 | 74 | 67 | 65 |
| Compression set (%) [22° C., 22 h, 25%] | 20 | 22 | 21 | 44 | 55 |

Note to Table 2
*1: "Keltan 578", containing 65 wt % of ethylene and ethylidene norbornene as the third component and having an iodine value of 16, a Mooney viscosity of 46 ($ML_{1+4}$ at 125° C.), and a specific gravity of 0.86. (made by Idemitsu DSM Co., Ltd.)
*2: "Mitsui DCP40C", containing 40% active ingredient. (made by Mitsui Petrochemical Industries, Ltd.)
*3: Zinc white #3
*4: HAF, "Asahi #70" (made by Asahi Carbon Co., Ltd.)
*5: "Escron G90", coumarone-indene-styrene copolymer resin having a softening point of 93° C., a bromine number of 13 g/100 g, and a number-average molecular weight of 625. (made by Nippon Steel Chemical Co., Ltd.)

TABLE 2-continued

| Run No. | Ref. Ex. 1 | Ex. 1 | Ex. 2 | Com. Ex. 1 | Com. Ex. 2 |
|---|---|---|---|---|---|

*6: rated as "good" if the surface of the mixture is tacky to the finger slightly touching it, and rated as "poor" if not.
*7: measured according to JIS K 6300.
*8: measured according to JIS K 6300.
*9: $t_{10}$ = time (minutes) to 10% vulcanization read from the time-stress curve on a rheometer.
$t_{90}$ = time (minutes) to 90% vulcanization read from the time-stress curve on a rheometer.
$\Delta S$ = difference between the maximum stress and the minimum stress read from the time-stress curve on a rheometer.
*10: measured according to JIS K 6301.

EXAMPLES 3 TO 5

Comparative Examples 3 to 5, and Referential Example 2

EPDM (2) and EPDM (3) (as component (A) in the formulation shown in Table 3) underwent mastication at 150° C. for 1 minute in a Banbury mixer (MIXTRON BB, made by Kobe Steel Co. Ltd.). The masticated EPDM's were subsequently mixed with other components shown in Table 3 for 4 minutes.

The resulting unvulcanized rubber was tested for physical properties, scorching properties, and crosslinking properties. The results are shown in Table 3. The unvulcanized rubber was crosslinked in a mold at 160° C. for 15 minutes. The resulting crosslinked product was tested for physical properties and heat resistance. The results are shown in Table 3.

It is noted from Table 3 that the sample in Referential Example 2 has a high Mooney viscosity ($ML_{1+4}$) and is poor in tackiness and processability, whereas the samples in Examples 3 to 5 and Comparative Examples 3 to 5 have improved processability.

The data of Mooney viscosity and the values of Vm for scorching properties indicate that the samples in Examples 3 to 5 are superior in processability to those in Comparative Examples 3 to 5.

The fact that the samples in Comparative Examples 3 to 5 have higher values of $t_5$ (for scorching properties) and $t_{10}$ and $t_{90}$ (for crosslinking properties) and lower values of $\gamma S$ than the sample in Referential Example 2 suggests the inhibition of curing (although it is not so severe in the case of crosslinking with peroxide). The samples in Comparative Examples 3 to 5 are inferior in crosslinking properties to those in Referential Example 2. This is indicated by the lower tensile strength, lower 100% modulus, lower hardness, higher elongation at break, and higher compression set. By contrast, the samples in Examples 3 to 5 are comparable to that in Referential Example 2. When it comes to the decrease in elongation at break after heat ageing (in the heat resistance test), the samples in Examples 3 to 5 are comparable to or better than that in Referential Example 2, whereas the samples in Comparative Examples 3 to 5 are considerably inferior to that in Referential Example 2.

TABLE 3

| Run No. | Ref. Ex. 2 | Ex. 3 | Ex. 4 | Ex. 5 | Com. Ex. 3 | Com. Ex. 4 | Com. Ex. 5 |
|---|---|---|---|---|---|---|---|
| Formulation (parts by weight) | | | | | | | |
| Component (A), EPDM (1)*1 | 65 | 65 | 65 | 65 | 65 | 65 | 65 |

TABLE 3-continued

| Run No. | Ref. Ex. 2 | Ex. 3 | Ex. 4 | Ex. 5 | Com. Ex. 3 | Com. Ex. 4 | Com. Ex. 5 |
|---|---|---|---|---|---|---|---|
| Component (A), EPDM (2)*2 | 40 | 40 | 40 | 40 | 40 | 40 | 40 |
| Component (B), sulfur | 1 | 1 | 1 | 1 | 1 | 1 | 1 |
| ZnO*3 | 5 | 5 | 5 | 5 | 5 | 5 | 5 |
| Stearic acid | 1 | 1 | 1 | 1 | 1 | 1 | 1 |
| Carbon black*4 | 150 | 150 | 150 | 150 | 150 | 150 | 150 |
| Process oil*5 | 85 | 85 | 85 | 85 | 85 | 85 | 85 |
| Vulcanization accelerator M*6 | 1 | 1 | 1 | 1 | 1 | 1 | 1 |
| Vulcanization accelerator TT*7 | 1 | 1 | 1 | 1 | 1 | 1 | 1 |
| Vulcanization accelerator CZ*8 | 1.5 | 1.5 | 1.5 | 1.5 | 1.5 | 1.5 | 1.5 |
| Vulcanization accelerator TRA*9 | 0.5 | 0.5 | 0.5 | 0.5 | 0.5 | 0.5 | 0.5 |
| Component (C) from Production Example 4 | — | 2.5 | 5 | 7.5 | — | — | — |
| Phenilic resin*10 | — | — | — | — | 2.5 | 5 | 7.5 |
| Properties of unvulcanized rubber | | | | | | | |
| Tackiness*11 | poor | good | good | good | good | good | good |
| $ML_{1+4}$ (100° C.)*12 | 72 | 65 | 64 | 62 | 67 | 65 | 66 |
| **Scorching properties (125° C.)*13** | | | | | | | |
| Vm | 46 | 44 | 43 | 41 | 44 | 43 | 43 |
| $t_5$ (minutes) | 9.0 | 9.0 | 9.0 | 9.1 | 8.9 | 8.7 | 8.5 |
| **Crosslinking properties (ODR, 160° C.)*14** | | | | | | | |
| $t_{10}$ (minutes) | 2.0 | 2.0 | 2.0 | 2.0 | 2.0 | 2.0 | 1.9 |
| $t_{90}$ (minutes) | 9.5 | 8.9 | 9.9 | 10.0 | 3.8 | 9.9 | 9.8 |
| ΔS (kgf · cm) | 31.5 | 31.6 | 31.4 | 31.0 | 29.3 | 28.7 | 28.1 |
| **Properties of vulcanized rubber (160° C. × 15 min)*15** | | | | | | | |
| Tensile strength; kgfcm$^2$ | 158 | 154 | 151 | 149 | 144 | 143 | 138 |
| 100% modulus | 52 | 50 | 49 | 47 | 46 | 42 | 39 |
| Elongation at break (%) | 310 | 310 | 320 | 360 | 360 | 400 | 410 |
| Hardness (JIS-A) | 71 | 71 | 71 | 70 | 70 | 68 | 68 |
| Compression set (%) [22° C., 22 h, 25%] | 63 | 61 | 63 | 63 | 64 | 66 | 71 |
| **Heat resistance (heat aging test)*16** | | | | | | | |
| ΔEB (130° C. × 70 h) | −35 | −29 | −35 | −39 | −44 | −49 | −55 |
| ΔEB (130° C. × 168 h) | −48 | −47 | −48 | −48 | −56 | −61 | −67 |
| ΔEB (150° C. × 70 h) | −50 | −49 | −50 | −50 | −59 | −64 | −69 |

Note to Table 3
*1: "Keltan 4802", containing 52 wt % of ethylene and ethylidene norbornene as the third component and having an iodine value of 16, a Mooney viscosity of 77 ($ML_{1+4}$ at 125° C.), and a specific gravity of 0.86. (made by Idemitsu DSM Co., Ltd.)
*2: "Keltan 708 × 15", containing 65 wt % of ethylene and ethylidene norbornene as the third component and having an iodine value of 16, a Mooney viscosity of 63 ($ML_{1+4}$ at 125° C.), a specific gravity of 0.87, and a type which is extended by paraffinic oil of 15 phr. (made by Idemitsu DSM Co., Ltd.)
*3: Zinc white #3
*4: "Seast SO" (made by Tokai Carbon Co., Ltd.)
*5: PW-380 (paraffin type) (made by Idemitsu Kosan Co., Ltd.)
*6: mercaptobenzothiazole
*7: tetramethylthiuramdisulfide
*8: N-cyclohexyl-2-benzothiazylsulfenamide
*9: dipentamethylenethiuramtetrasulfide
*10: "Hitanol 1501" (made by Hitachi Chemical Co., Ltd.)
*11: rated as "good" if the surface of the mixture is tack to the finger slightly touching it, and rated as "poor" if not.
*12: measured according to JIS K 6300.
*13: measured according to JIS K 6300.
*14: $t_{10}$ = time (minutes) to 10% vulcanization read from the time-stress curve on a rheometer.
$t_{90}$ = time (minutes) to 90% vulcanization read from the time-stress curve on a rheometer.
ΔS = difference between the maximum stress and the minimum stress read from the time-stress curve on a rheometer.
*15: measured according to JIS K 6301.
*16: ΔEB = (A − B)/B × 100 where
A: elongation at break after heat ageing test
B: elongation at break before heat ageing test

[Effect of the Invention]

The present provides a rubber composition based on hydrocarbon rubber which exhibits improved processability over hydrocarbon rubber used alone but has no bad influence on the physical properties and heat resistance of its vulcanizate. The rubber composition of the present invention is free from any trouble involved in crosslinking with a peroxide which is often used for EPR and EPDM. Therefore, it will find general use in the rubber industry.

What is claimed is:

1. A rubber composition comprising (A) a hydrocarbon rubber, (B) an agent for vulcanizing or crosslinking and (C) a hydrogenated petroleum resin having a bromine number of not greater than 10 (g/100 g) which is obtained by hydrogenating a copolymer of cyclopentadiene, dicyclopentadiene or a combination thereof with an aromatic group-containing vinyl monomer.

2. The rubber composition of claim 1, wherein the component (A) is at least one hydrocarbon rubber selected from the group consisting of ethylene-propylene copolymer rubber, ethylene-propylene-diene copolymer rubber, natural rubber, isoprene rubber and styrene-butadiene.

3. The rubber composition of claim 1, wherein the component (A) is butadiene rubber.

4. The rubber composition of claim 1, wherein the hydrogenated petroleum resin is obtained by hydrogenating a styrene copolymer selected from the group consisting of a cyclopentadiene styrene-copolymer, a dicyclopentadiene-styrene copolymer and a combination thereof.

5. The rubber composition of claim 1, wherein component (B) is in an amount of 0.2 to 20 parts by weight and component (C) is in an amount of 0.5 to 50 parts by weight for 100 parts by weight of component (A).

6. The rubber composition of claim 1, wherein the component (B) is in an amount of 0.2 to 20 parts by weight and the component (C) is in an amount of 0.5 to 50 parts by weight for 100 parts by weight of the component (A), and the hydrogenated petroleum resin is obtained by hydrogenating a styrene copolymer selected from the group consisting of a cyclopentadiene-styrene copolymer, a dicyclopentadiene-styrene copolymer and a combination thereof.

7. The rubber composition of claim 6, wherein the component (A) is an ethylene-propylene copolymer rubber containing 15 to 50 mole % propylene.

8. The rubber composition of claim 6, wherein the component (A) is an ethylene-propylene-diene copolymer rubber containing 15 to 50 mole % propylene and wherein the diene is selected from the group consisting of dicyclopentadiene, ethylidenenorbornene and 1,4-hexadiene.

9. The rubber composition of claim 6, wherein the component (B) is selected from the group consisting of sulfur, sulfur chloride, sulfur dichloride, morpholine, disulfide, alkylphenol disulfide, selenium, tellurium, p-quinonedioxime, p,p'-dibenzoylaquinonedioxime, tetrachloro-p-benzoquinone, poly-p-dinitrobenzene, tert-butylhydroperoxide, 1,1,3,3-tetramethylbutylhydrope roxide, P-methanehydroperoxide, cumenehydroperoxide, diisopropylbenzenehydroperoxide, 2,5-dimethylhexane-2,5-dihydroperoxide, di-tert-butylperoxide, dicumylperoxide, tert-butylcumylperoxide, 1,1-bi-(tert-butylperoxy) cyclododecane, 2,2-bis(tert-butylperoxy)octane, 1,1-di-tert-butylperoxycyclohexane, 2,5-dimethyl-2,5-di(tert-butylperoxy)hexane, 2,5-dimethyl-2,5-(tert-butylperoxy) hexyne-3, 1,3-bis(tert-butylperoxy-isopropyl)benzene, 2,5-dimethyl-2, 5-di(benzoylperoxy)hexane, 1,1-bis(tert-butylperoxy)-3,3, 5-trimethylcyclohexane, n-butyl-4,4-bis(tert-butylperoxy-)valerate, benzoylperoxide, m-tolylperoxide, p-chlorobenzoylperoxide, 2,4-di-chlorobenzoylperoxide, tert-butylperoxyisobutyrate, tert-butylperoxy-2-ethylhexanoate, tert-butylperoxybenzoate, tert-butylperoxyisopropylcarbonate, and tert-butylperoxyallycarbonate, ethylene glycol dimethacrylate trimethylolpropane trimethylacrylate and triallyl isocyanurate.

10. The rubber composition of claim 6, wherein the hydrogenated petroleum resin has an average molecular weight of 200 to 2000 and a softening point of 40° to 180° C.

11. The rubber composition of claim 1, wherein the hydrogenated petroleum resin has a bromine number of not greater than 8 (g/100 g).

12. The rubber composition of claim 6, wherein the hydrogenated petroleum resin has a bromine number of not greater than 8 (g/100 g).

13. The rubber composition of claim 9, wherein the hydrogenated petroleum resin has a bromine number of not greater than 8 (g/100 g).

14. The rubber composition of claim 9, wherein the component (A) is butadiene rubber.

* * * * *